US012424109B2

(12) United States Patent
Narasimhulu et al.

(10) Patent No.: US 12,424,109 B2
(45) Date of Patent: Sep. 23, 2025

(54) SYSTEM, METHOD, AND APPARATUS FOR MINIMIZING AIRCRAFT CRUISE OPERATIONAL COSTS

(71) Applicant: The Boeing Company, Arlington, VA (US)

(72) Inventors: Veeresh Kumar Masaru Narasimhulu, Bangalore (IN); Chaitanya Pavan K. Aripirala, Bangalore (IN); Joost E. Koennen, Meppel (NL)

(73) Assignee: The Boeing Company, Arlington, VA (US)

( * ) Notice: Subject to any disclaimer, the term of this patent is extended or adjusted under 35 U.S.C. 154(b) by 248 days.

(21) Appl. No.: 18/175,126

(22) Filed: Feb. 27, 2023

(65) Prior Publication Data

US 2024/0290211 A1 Aug. 29, 2024

(51) Int. Cl.

| | |
|---|---|
| ***G08G 5/32*** | (2025.01) |
| ***G08G 5/53*** | (2025.01) |
| ***G08G 5/55*** | (2025.01) |

(52) U.S. Cl.
CPC ................. *G08G 5/32* (2025.01); *G08G 5/53* (2025.01); *G08G 5/55* (2025.01)

(58) Field of Classification Search
CPC .. G08G 5/0034; G08G 5/0052; G08G 5/0021; G08G 5/0013
USPC ........................................................... 701/4
See application file for complete search history.

(56) References Cited

U.S. PATENT DOCUMENTS

| | | | | |
|---|---|---|---|---|
| 5,574,647 | A * | 11/1996 | Liden | G05D 1/0005 701/8 |
| 10,847,039 | B1 * | 11/2020 | Shabadi | G08G 5/0091 |
| 2017/0249849 | A1 * | 8/2017 | De Prins | G08G 5/34 |
| 2018/0261105 | A1 * | 9/2018 | Garrido-Lopez | G06Q 10/047 |
| 2019/0186288 | A1 * | 6/2019 | Jastrzembowski | F02C 9/00 |
| 2020/0273348 | A1 * | 8/2020 | Root | G07C 5/0808 |
| 2022/0252401 | A1 * | 8/2022 | Lupu | G08G 5/21 |

FOREIGN PATENT DOCUMENTS

KR 20190115596 A * 10/2019

OTHER PUBLICATIONS

English Translation of KR20190115596, accessed via Espacenet Jan. 2025 (Year: 2025).*

* cited by examiner

*Primary Examiner* — Krishnan Ramesh
(74) *Attorney, Agent, or Firm* — Kunzler Bean & Adamson

(57) ABSTRACT

Disclosed herein is cruise altitude recommendation system and method for determining a cruise altitude recommendation for a particular aircraft. The method includes receiving flight plan information for an aircraft, generating an altitude recommendation plan during cruise operations for the aircraft based on the flight plan information and a fuel flow model previously generated for the aircraft, and outputting the altitude recommendation plan.

20 Claims, 5 Drawing Sheets

SYSTEM, METHOD, AND APPARATUS FOR MINIMIZING AIRCRAFT CRUISE OPERATIONAL COSTS

FIELD

This disclosure relates generally to aircraft operations, and more particularly to minimizing aircraft vertical profile costs.

BACKGROUND

Cruise altitude of an aircraft is a significant factor influencing fuel consumption. Aircraft are typically designed to perform most efficiently at certain altitudes based on conditions in which the aircraft are operating. Operating at altitudes that promote efficient fuel consumption is achieved using a generic database fitted into the flight management systems onboard the aircraft.

SUMMARY

The subject matter of the present application has been developed in response to the present state of the art, and in particular, in response to the shortcomings of current cruise altitude estimating techniques and systems, that have not yet been fully solved by currently available techniques. Accordingly, the subject matter of the present application has been developed to provide apparatus, system, and method that overcome at least some of the above-discussed shortcomings of prior art techniques.

The following is a non-exhaustive list of examples, which may or may not be claimed, of the subject matter, disclosed herein.

In one example, a method includes receiving flight plan information for an aircraft. The method also includes generating an altitude recommendation plan during cruise operations for the aircraft based on the flight plan information and a fuel flow model previously generated for the aircraft. The method also includes outputting the altitude recommendation plan.

In another example, a system includes an altitude recommendation device that includes a communication device configured to flight plan information for an aircraft and a processor. The processor is configured to generate an altitude recommendation plan for cruise operations for the aircraft based on the flight plan information and a fuel flow model previously generated for the aircraft; and output the altitude recommendation plan.

In still another example, a computer-readable medium performs an aircraft specific cruise altitude determination method, via a computer. The method includes the steps of receiving flight plan information for an aircraft, generating an altitude recommendation plan during cruise operations for the aircraft based on the flight plan information and a fuel flow model previously generated for the aircraft, and outputting the altitude recommendation plan.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The following detailed description is intended to provide examples of apparatuses, systems, and methods for carrying out the disclosure. Actual scope of the disclosure is defined by the appended claims.

Cruise altitude of an aircraft is a significant factor influencing fuel consumption. Aircraft are typically designed to perform most efficiently at certain altitudes based on the current operating conditions, which is achieved by a generic database included in flight management systems onboard aircraft. Currently, airlines use a vertical profile calculated by an onboard flight management computer (FMC)/flight planning system, which uses a generic database of fuel flow values. This technique results in inefficiencies, as each aircraft is different due to factors like manufacturing, maintenance, wear and tear, etc.

Figure 2:
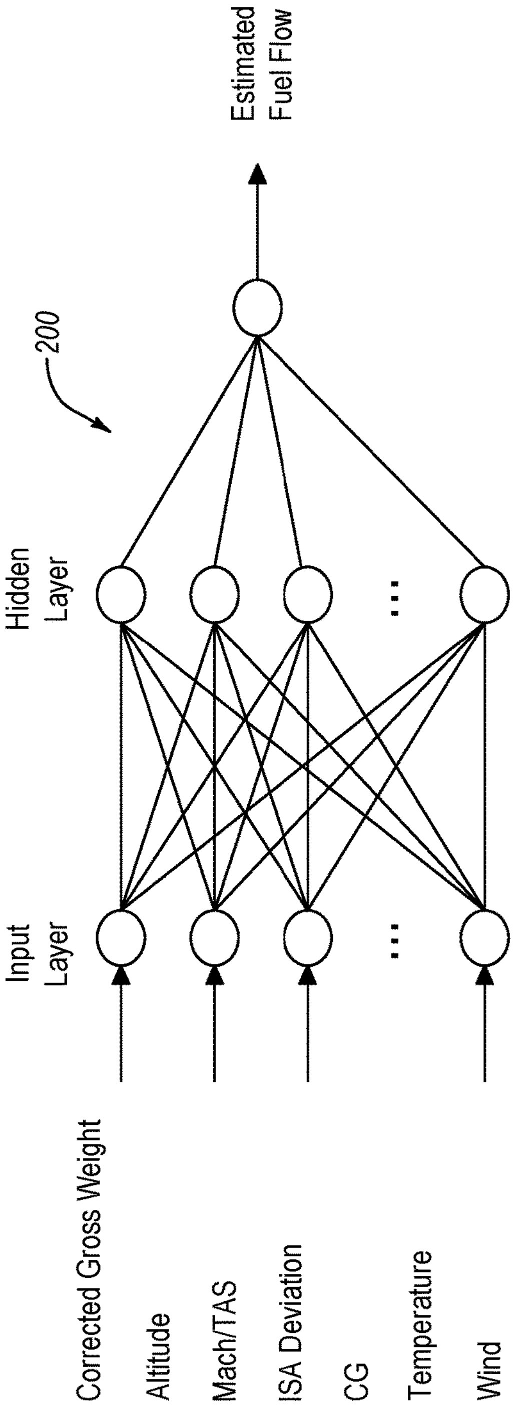
FIG. 2 is a schematic block diagram of a neural network used by components of the system of FIG. 1, according to one or more examples of the present disclosure.

In various examples, fuel, being the most important recurring cost of aircraft operations, is optimized based on information unique to an aircraft. Each aircraft is unique in its operational performance. Accordingly, in certain examples, historical aircraft-specific data is used to model the unique performance of an aircraft. Then, the model is used to predict the most economical vertical profile specific for that aircraft. As shown in FIG. 2, the model is a deep neural network model that receives millions of historical data points to predict fuel flow over a vast range of conditions. The model is then used to iteratively predict a least-cost vertical profile for a given flight plan and day of operations data (e.g., winds aloft, temperature, etc.).

Figure 1:
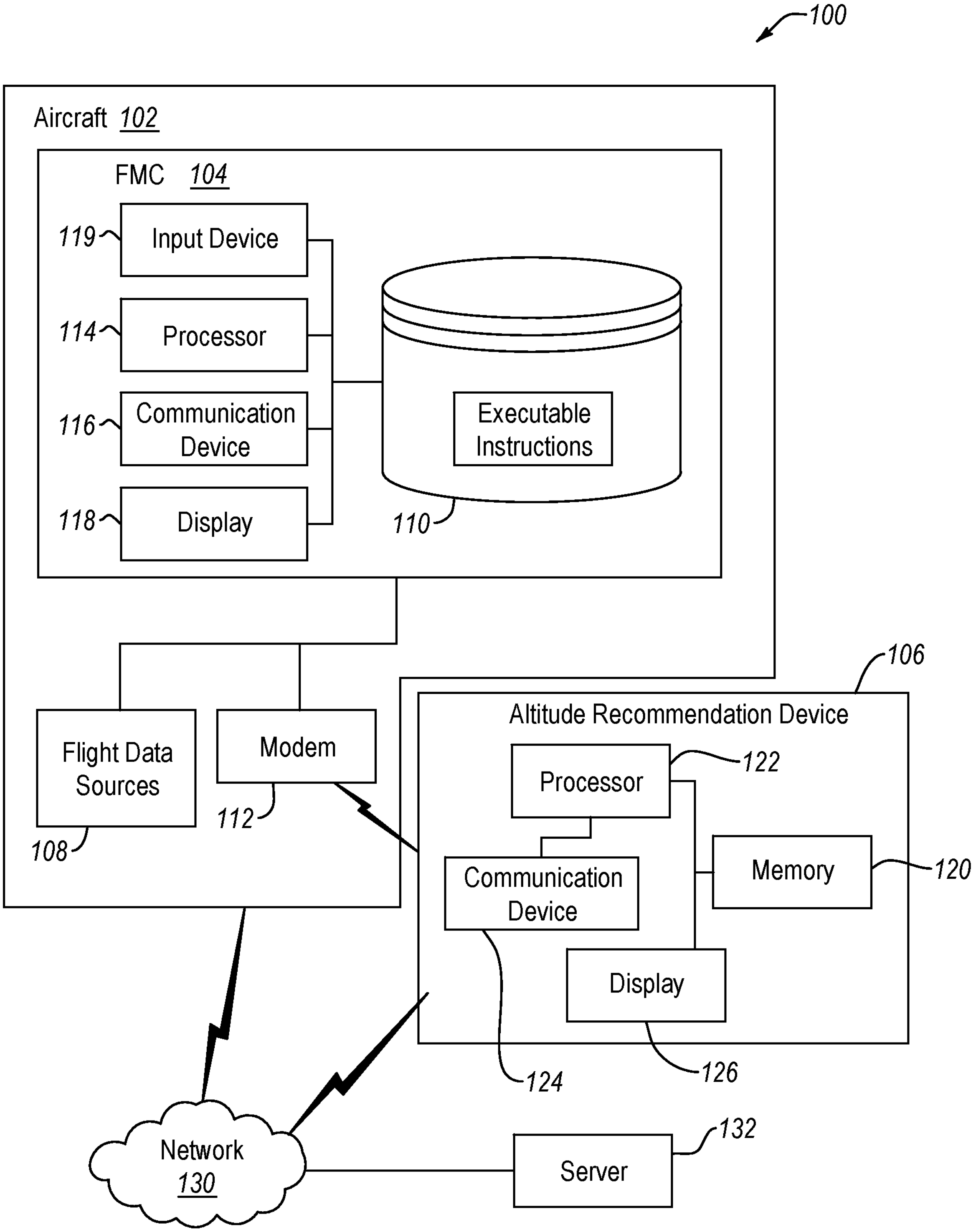
FIG. 1 is a schematic block diagram of a system for minimizing aircraft cruise operational costs, according to one or more examples of the present disclosure.

Referring to FIG. 1, in various embodiments, a system 100 includes an aircraft 102 and an altitude recommendation device 106. The aircraft 102 includes a flight management computer (FMC) 104 that is in data communication with at least various flight data sources 108 and/or a data modem 112 coupled to external devices/servers. The altitude recommendation device 106 may be in signal communication with the FMC 104 of the aircraft 102 via the data modem 112. The aircraft 102 and the altitude recommendation device 106 may be in signal communication with a server 132 over a public or private data network 130. In an alternate embodiment, the altitude recommendation device 106 may be part of the FMC 104 or included onboard the aircraft 102.

In various embodiments, the FMC 104 includes a processor 114, a communication device 116, a display 118, an input device 119, and a memory device 110 configured to store executable instructions. The FMC 104 is configured to receive flight data from the flight data sources 108 and execute flight operations, such as, without limitation, auto piloting, based on the received flight data. The FMC 104 may also store the received flight data in the memory device 110 and/or transmit the received flight data to the server 132 or the altitude recommendation device 106 via the communication device 116, the modem 112, and/or the network 130. Communication with the remote server 132 may be via wired and/or wireless communication techniques.

In various embodiments, the altitude recommendation device 106 includes a memory device 120 configured to store executable instructions, a processor 122, a communication device 124, and a display 126. The executable instructions stored in the memory device 120 may cause the processor 122 to receive flight data from the flight data sources 108 via the modem 112, and generate an optimum cruise altitude value(s) based on the received flight data, a previously determined cruise altitude model, and flight plan information stored in the memory device 110 or 120. The executable instructions may also cause the processor 122 to output generated optimum cruise altitude value(s) to the display 126 or to the FMC 104 via the communication device 124, the modem 112, and the communication device 116. The altitude recommendation device 106 may be a tablet computer or comparable device that includes a flight deck (FD) advisor application program.

In various embodiments, a user can enter the optimum cruise altitude value(s) produced by the altitude recommendation device 106 directly via the input device 119. In various embodiments, the user may activate the altitude recommendation device 106 to transfer the optimum cruise altitude value(s) directly to the FMC 104 via the communication device 124, the modem 112, and the communication device 116.

Referring to FIG. 2, and according to some examples, disclosed herein is a neural network 200 that receives at an input layer numerous types of data recorded from previous flights of the aircraft 102. The neural network 200 may be implemented at various devices of the system 100 or distributed amongst the devices of the system 100. The previously recorded data may include corrected gross weight (GW), altitude, speed (e.g., Mach/true airspeed (TAS)), international standard atmosphere (ISA) deviation, center-of-gravity (CG), temperature, wind (speed/direction), and the like. The output of the neural network 200 is an estimated fuel flow value for the aircraft 102.

Figure 3:
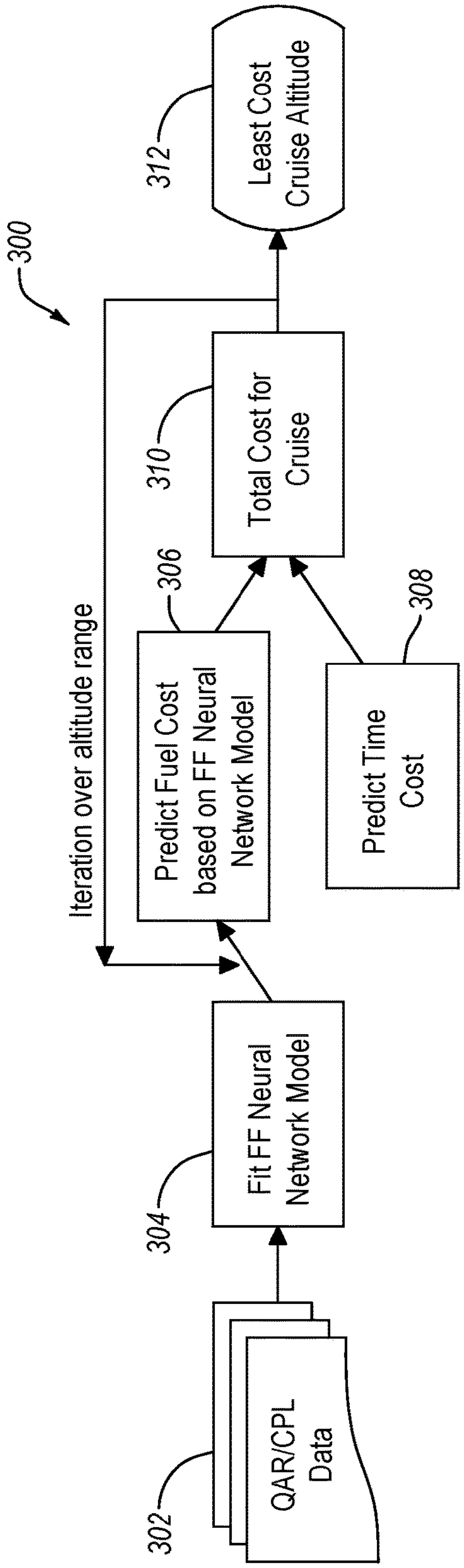
FIG. 3 is a schematic flow diagram of a method of generating a least-cost cruise altitude value, according to one or more examples of the present disclosure.

Referring to FIG. 3, and according to some examples, disclosed herein is a method 300 of generating an optimal vertical profile using the estimated fuel flow (depicted in FIG. 2). The method 300 can be executed using the components of the present disclosure. The method 300 includes (block 302) using actual flight recordings (e.g., quick access recorder (QAR) data or continuous parameter logging (CPL) data) for an aircraft to build a tail-specific deep neural network model (block 304), as depicted in FIG. 2, which is used to create an estimated fuel flow neural network model during aircraft cruise operations. The method 300 includes (block 306) estimating a candidate cruise altitude fuel cost using the fuel flow neural network model that uses current flight plan information and related flight information (e.g., wind, temperature, ISA, GW, CG). The method 300 includes (block 308) estimating time cost based on optimum speeds for the candidate cruise altitude. The method 300 includes (block 310) calculating the total cost for the candidate cruise altitude by summing the fuel cost and the time cost. The total cost may include a previously determined cost for a step climb. The total cost may be based on cost of the step climb and cruise for a nominal distance (e.g., 500 NM or the like) at the candidate cruise altitude. The method 300 repeats or iterates the cost calculations (blocks 306-310) for other candidate cruise altitudes. The method 300 includes (block 312) determining which of the candidate cruise altitudes results in the lowest total cost. The aircraft is then flown according to the candidate cruise altitudes that result in the lower total cost.

Figure 4:
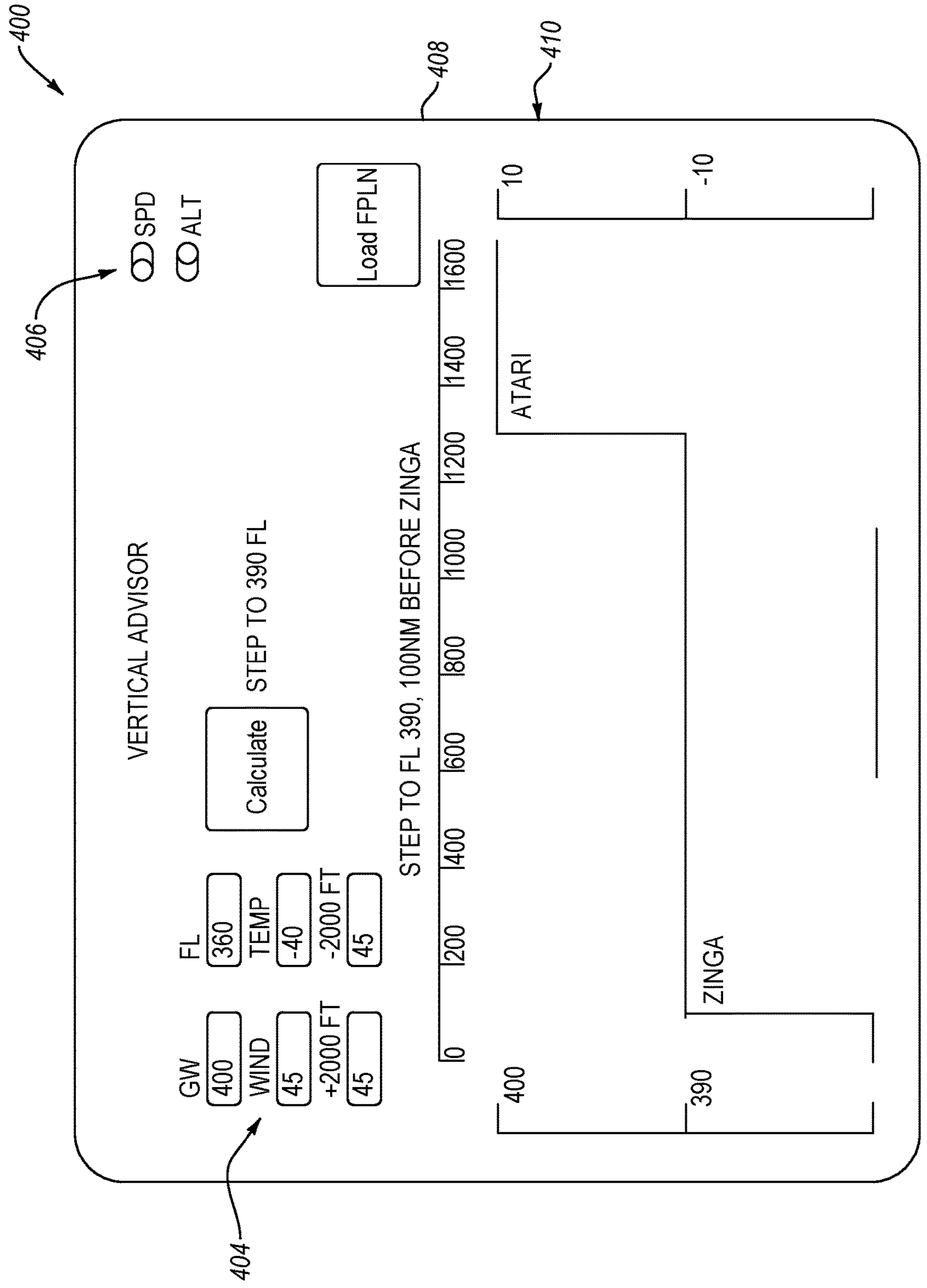
FIG. 4 is a screen shot of a user interface produced by components of the system of FIG. 1, according to one or more examples of the present disclosure.

Referring to FIG. 4, and according to some examples, disclosed herein is an exemplary vertical advisor image 400 outputted by the altitude recommendation device 106 on the display 126. The vertical advisor image 400 includes a manual flight data entry location 404, a selectable display setting 406, a flight plan load button 408, and a speed or vertical flight plan recommendation image area 410. The manual flight data entry location 404 that allows a user to manually enter different flight plan information, such as, without limitation, GW, wind speed, cruise altitude, temperature, and the like. The selectable display setting 406 allows the user to select whether to display a speed recommendation or a vertical/altitude recommendation in the speed or vertical flight plan recommendation image area 410. User activation of the flight plan load button 408 allows a user to automatically load a previously generated flight plan for analysis. The processor 122 uses the automatically loaded flight plan or the manually entered flight plan information to calculate optimal speed and cruise altitude values at various moments in the cruise phase of the flight plan for the aircraft 102. The speed or vertical flight plan recommendation image area 410 presents the calculated optimal speed or cruise altitude values.

The exemplary vertical advisor image 400 may be produced by an FD advisor application program executed by the altitude recommendation device 106, such as a tablet computer.

In a connected operational mode, the modem 112 (e.g., aircraft interface device (AID)/transmitting portable electronic device (TPED)) connects to the FMC 104 to transmit flight plan information to the altitude recommendation device 106 and the FD advisor application program stored in the memory device 120 via a Wi-Fi or other wireless protocol to the FMC 104.

In a non-connected operational mode, a pilot manually enters the flight plan information into the altitude recommendation device 106 and the FD advisor application program via the input device 119.

Once the flight is complete, flight data produced by the flight data sources is uploaded to a cloud server(s) 132, which could be used to perform post-flight analytics to estimate future savings and fine tune a tail-specific fuel flow model.

Figure 5:
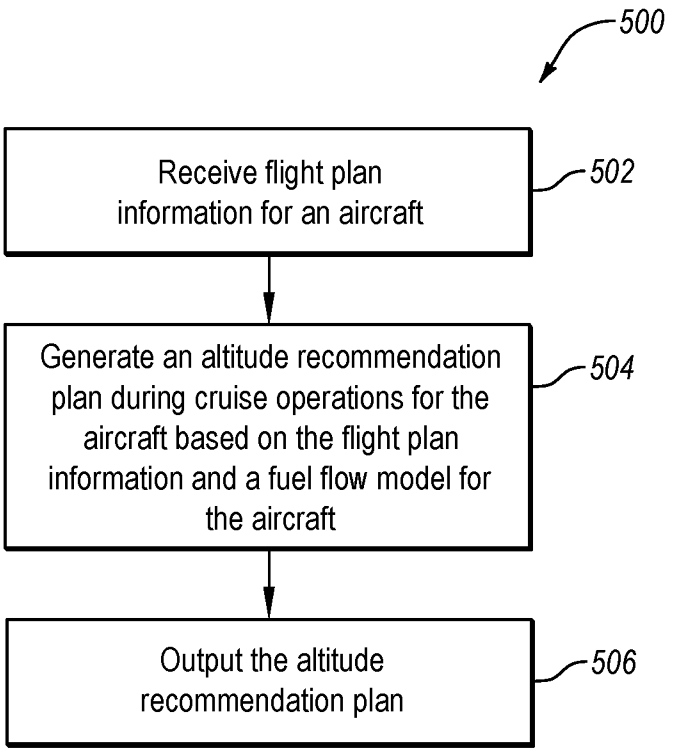
FIG. 5 is a is a schematic flow diagram of a method of outputting a recommended cruise altitude, according to one or more examples of the present disclosure.

Referring to FIG. 5, and according to some examples, disclosed herein is a method 500 of providing improved cruise altitude recommendations for an aircraft. The method 500 can be executed using the apparatuses and systems of the present disclosure. The method 500 includes (block 502) receiving flight plan information for the aircraft, (block 504) generating an altitude recommendation plan during cruise operations for the aircraft based on the flight plan information and a previously determined fuel flow model for the aircraft, and (block 506) outputting the altitude recommendation plan.

Figure 6:
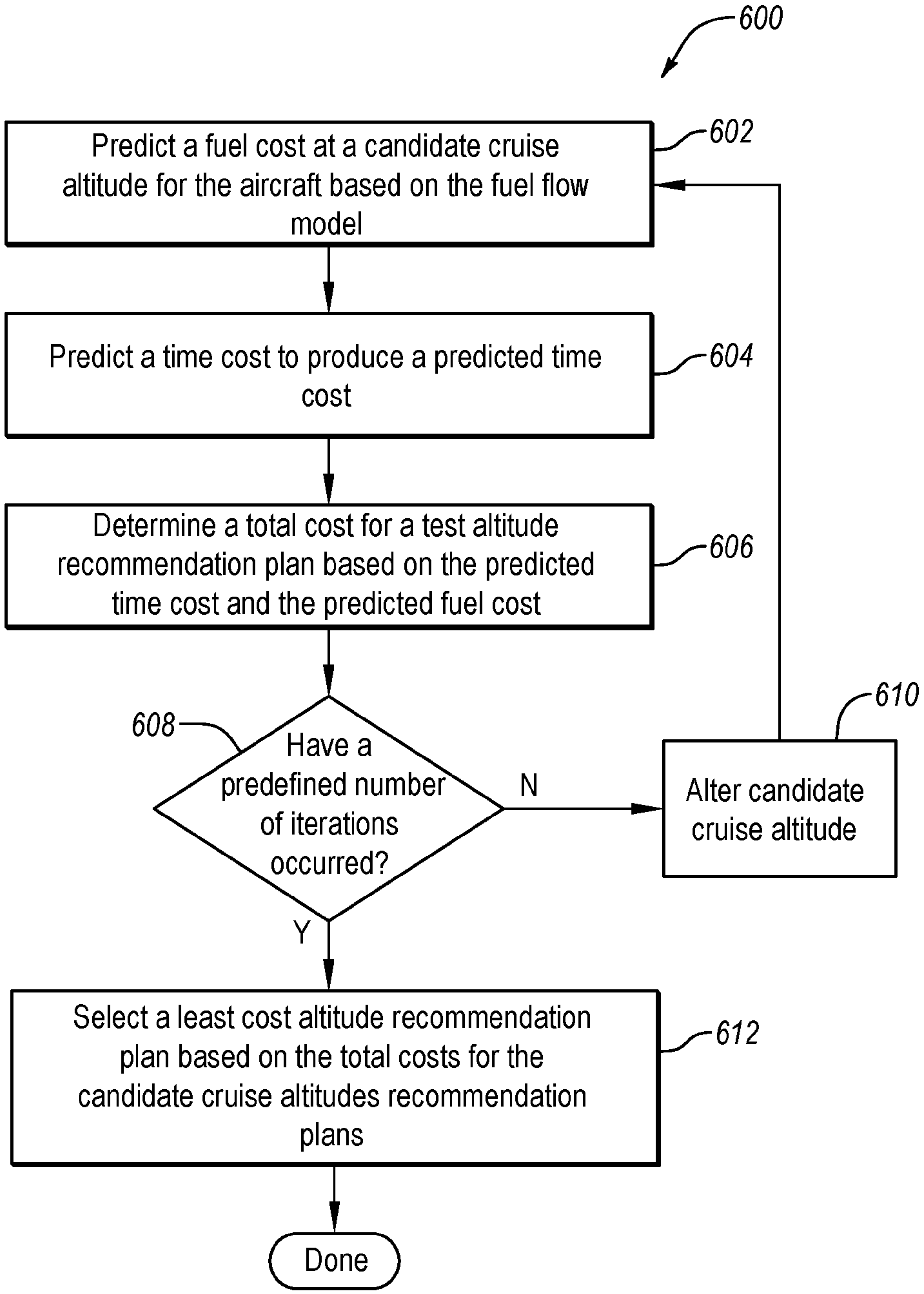
FIG. 6 is a schematic flow diagram of a method of outputting a recommended cruise altitude, according to one or more examples of the present disclosure.

Referring to FIG. 6, and according to some examples, disclosed herein is a method 600 of providing improved cruise altitude recommendations for an aircraft. The method 600 can be executed using the apparatuses and systems of the present disclosure. The method 600 includes (block 602) predicting a fuel cost at a candidate cruise altitude for the aircraft based on the fuel flow model and (block 604) predicting a time cost based on airline operating cost per hour to produce a predicted time cost. The method 600 further includes (block 606) determining a total cost for a test altitude recommendation plan based on the predicted time cost and the predicted fuel cost. The method 600 additionally includes (block 608) determining if a predefined number of iterations have occurred. If the predefined number of iterations have not occurred, the method 600 includes (block 610) altering the candidate cruise altitude and repeating the steps at blocks 602-606. However, if the predefined number of iterations have occurred, the method 600 includes (block 612) selecting a least cost altitude recommendation plan based on the total costs for the candidate cruise altitudes recommendation plans.

The following is a non-exhaustive list of examples, which may or may not be claimed, of the subject matter, disclosed herein.

The following portion of this paragraph delineates example 1 of the subject matter, disclosed herein. According to example 1, a method includes a step of receiving flight plan information for an aircraft. Upon completion of receiving the flight plan information, the method includes the step of generating an altitude recommendation plan during cruise operations for the aircraft based on the flight plan information and a fuel flow model previously generated for the aircraft. Upon completion of generating the altitude recommendation plan, the method includes the step of outputting the altitude recommendation plan.

The following portion of this paragraph delineates example 2 of the subject matter, disclosed herein. According to example 2, which encompasses example 1, above, the method also includes a step of receiving flight data for the aircraft from a plurality of previous flights. Upon completion of receiving flight data for the aircraft, the method includes the step of generating the fuel flow model for the aircraft based on the flight data and a fuel flow model based on a type of the aircraft.

The following portion of this paragraph delineates example 3 of the subject matter, disclosed herein. According to example 3, which encompasses any of examples 1 or 2, above, the method also includes a step of generating an estimated fuel flow based on the flight data inserted into a neural network. Upon completion of generating the estimated fuel flow, the method includes the step of generating the altitude recommendation plan based on the estimated fuel flow.

The following portion of this paragraph delineates example 4 of the subject matter, disclosed herein. According to example 4, which encompasses any of examples 1-3, above, the flight data includes corrected gross weight and center-of-gravity of the aircraft and altitude, airspeed, international standard atmosphere deviation, temperature, wind at a plurality of locations for the plurality of previous flights.

The following portion of this paragraph delineates example 5 of the subject matter, disclosed herein. According to example 5, which encompasses any of examples 1-4, above, the step of generating the altitude recommendation plan includes steps of a) predicting a fuel cost for the aircraft based on the estimated fuel flow and the flight plan information to produce a predicted fuel cost, b) predicting a time cost based on airline operating cost per hour and estimated flight time to produce a predicted time cost, c) determining a total cost for a test altitude recommendation plan based on the predicted time cost and the predicted fuel cost, repeating a-c) to produce additional test altitude recommendation plans, and selecting a least cost altitude recommendation plan based on the total costs for the test altitude recommendation plans.

The following portion of this paragraph delineates example 6 of the subject matter, disclosed herein. According to example 6, which encompasses example 1, above, the step of outputting includes a step of sending the least cost altitude recommendation plan to a flight management system of the aircraft.

The following portion of this paragraph delineates example 7 of the subject matter, disclosed herein. According to example 7, which encompasses example 6, above, the step of sending includes a step of wirelessly transmitting the altitude recommendation plan to the flight management system of the aircraft.

The following portion of this paragraph delineates example 8 of the subject matter, disclosed herein. According to example 8, a system includes an altitude recommendation device that includes a communication device configured to receive flight plan information for an aircraft and a processor. The processor is configured to generate an altitude recommendation plan for cruise operations for the aircraft based on the flight plan information and a fuel flow model previously generated for the aircraft; and output the altitude recommendation plan.

The following portion of this paragraph delineates example 9 of the subject matter, disclosed herein. According to example 9, which encompasses example 8, above, the communication device is further configured to receive flight data for the aircraft from a plurality of previous flights and the processor is further configured to generate the fuel flow model for the aircraft based on the flight data and a fuel flow model based on a type of the aircraft.

The following portion of this paragraph delineates example 10 of the subject matter, disclosed herein. According to example 10, which encompasses example 9, above, the processor is further configured to generate an estimated fuel flow based on the flight data inserted into a neural network and generate the altitude recommendation plan based on the estimated fuel flow insert the flight data into a neural network configured to generate an estimated fuel flow based on the flight data.

The following portion of this paragraph delineates example 11 of the subject matter, disclosed herein. According to example 11, which encompasses example 10, above, the flight data includes corrected gross weight of the aircraft, center-of-gravity of the aircraft, altitude, airspeed, international standard atmosphere deviation, temperature, wind for the plurality of previous flights.

The following portion of this paragraph delineates example 12 of the subject matter, disclosed herein. According to example 12, which encompasses example 11, above, the processor is further configured to a) predict a fuel cost for the aircraft based on the estimated fuel flow and the flight plan information to produce a predicted fuel cost, predict a time cost based on airline operating cost per hour and estimated flight time to produce a predicted time cost, c) determine a total cost for a test altitude recommendation plan based on the predicted time cost and the predicted fuel cost, repeat a-c) to produce additional test altitude recommendation plans, and select a least cost altitude recommendation plan based on the total costs for the test altitude recommendation plans.

The following portion of this paragraph delineates example 13 of the subject matter, disclosed herein. According to example 13, which encompasses of any of examples 8-12, above, the processor is further configured to send the least cost altitude recommendation plan to a flight management system of the aircraft.

The following portion of this paragraph delineates example 14 of the subject matter, disclosed herein. According to example 14, which encompasses example 13, above, the processor is further configured to wirelessly transmit the altitude recommendation plan to the flight management system of the aircraft.

The following portion of this paragraph delineates example 15 of the subject matter, disclosed herein. According to example 15, a computer-readable medium performs an aircraft specific cruise altitude determination method, via a computer. The method includes the steps of receiving flight plan information for an aircraft, generating an altitude recommendation plan during cruise operations for the aircraft based on the flight plan information and a fuel flow model previously generated for the aircraft, and outputting the altitude recommendation plan.

The following portion of this paragraph delineates example 16 of the subject matter, disclosed herein. According to example 16, which encompasses example 15, above, the method further includes the steps of receiving flight data for the aircraft from a plurality of previous flights and generating the fuel flow model for the aircraft based on the flight data and a fuel flow model based on a type of the aircraft.

The following portion of this paragraph delineates example 17 of the subject matter, disclosed herein. According to example 17, which encompasses example 16, above, the method further includes the steps of generating an estimated fuel flow based on the flight data inserted into a neural network, and generating the altitude recommendation plan based on the estimated fuel flow.

The following portion of this paragraph delineates example 18 of the subject matter, disclosed herein. According to example 18, which encompasses example 17, above, the flight data includes corrected gross weight and center-of-gravity of the aircraft and altitude, airspeed, international standard atmosphere deviation, temperature, wind at a plurality of locations for the plurality of previous flights.

The following portion of this paragraph delineates example 19 of the subject matter, disclosed herein. According to example 19, which encompasses example 18, above, the method further includes the steps of a) predicting a fuel cost for the aircraft based on the estimated fuel flow and the flight plan information to produce a predicted fuel cost, b) predicting a time cost based on airline operating cost per hour and estimated flight time to produce a predicted time cost, c) determining a total cost for a test altitude recommendation plan based on the predicted time cost and the predicted fuel cost, repeating a-c) to produce additional test altitude recommendation plans, and selecting a least cost altitude recommendation plan based on the total costs for the test altitude recommendation plans.

The following portion of this paragraph delineates example 20 of the subject matter, disclosed herein. According to example 20, which encompasses any of examples 15-19, above, the method further includes the step of sending the least cost altitude recommendation plan to a flight management system of the aircraft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

In the above description, certain terms may be used such as “up,” “down,” “upper,” “lower,” “horizontal,” “vertical,” “left,” “right,” “over,” “under” and the like. These terms are used, where applicable, to provide some clarity of description when dealing with relative relationships. But, these terms are not intended to imply absolute relationships, positions, and/or orientations. For example, with respect to an object, an “upper” surface can become a “lower” surface simply by turning the object over. Nevertheless, it is still the same object. Further, the terms “including,” “comprising,” “having,” and variations thereof mean “including but not limited to” unless expressly specified otherwise. An enumerated listing of items does not imply that any or all of the items are mutually exclusive and/or mutually inclusive, unless expressly specified otherwise. The terms “a,” “an,” and “the” also refer to “one or more” unless expressly specified otherwise. Further, the term “plurality” can be defined as “at least two.” Moreover, unless otherwise noted, as defined herein a plurality of particular features does not necessarily mean every particular feature of an entire set or class of the particular features.

Additionally, instances in this specification where one element is “coupled” to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, “adjacent” does not necessarily denote contact. For example, one element can be adjacent another element without being in contact with that element.

As used herein, the phrase “at least one of”, when used with a list of items, means different combinations of one or more of the listed items may be used and only one of the items in the list may be needed. The item may be a particular object, thing, or category. In other words, “at least one of” means any combination of items or number of items may be used from the list, but not all of the items in the list may be required. For example, “at least one of item A, item B, and item C” may mean item A; item A and item B; item B; item A, item B, and item C; or item B and item C. In some cases, “at least one of item A, item B, and item C” may mean, for example, without limitation, two of item A, one of item B, and ten of item C; four of item B and seven of item C; or some other suitable combination.

Unless otherwise indicated, the terms “first,” “second,” etc. are used herein merely as labels, and are not intended to impose ordinal, positional, or hierarchical requirements on the items to which these terms refer. Moreover, reference to, e.g., a “second” item does not require or preclude the existence of, e.g., a “first” or lower-numbered item, and/or, e.g., a “third” or higher-numbered item.

As used herein, a system, apparatus, structure, article, element, component, or hardware “configured to” perform a specified function is indeed capable of performing the specified function without any alteration, rather than merely having potential to perform the specified function after further modification. In other words, the system, apparatus, structure, article, element, component, or hardware “configured to” perform a specified function is specifically selected, created, implemented, utilized, programmed, and/or designed for the purpose of performing the specified function. As used herein, “configured to” denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being “configured to” perform a particular function may additionally or alternatively be described as being “adapted to” and/or as being “operative to” perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller/processor, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit/processor or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method comprising:
receiving flight plan information for an aircraft;
generating a least cost altitude recommendation plan during cruise operations for the aircraft based on the flight plan information and a fuel flow model previously generated for the aircraft, wherein generating the least cost altitude recommendation plan comprises:
generating a plurality of test altitude recommendation plans, each generated by:
predicting a fuel cost for the aircraft based on an estimated fuel flow and the flight plan information to produce a predicted fuel cost;
predicting a time cost based on an operating cost per hour and an estimated flight time to produce a predicted time cost; and
determining a total cost based on the predicted time cost and the predicted fuel cost; and
selecting one of the plurality of test altitude recommendations plans, associated with the lowest total cost, as the least cost altitude recommendation plan;
outputting the least cost altitude recommendation plan to a flight management computer;
executing, via the flight management computer, flight operations of the aircraft based on the least cost altitude recommendation plan;
receiving flight data for the aircraft from a plurality of previous flights;
generating the fuel flow model for the aircraft based on the flight data and a fuel flow model based on a type of the aircraft;
inserting the flight data into a neural network; and
generating the estimated fuel flow based on output from the neural network after inserting the flight data into the neural network.

2. The method of claim 1, wherein the flight data includes at least one of corrected gross weight of the aircraft, center-of-gravity of the aircraft, altitude, airspeed, international standard atmosphere deviation, temperature, and wind at a plurality of locations for the plurality of previous flights.

3. The method of claim 2, wherein outputting the least cost altitude recommendation plan comprises sending the least cost altitude recommendation plan to the flight management system of the aircraft.

4. The method of claim 3, wherein sending the least cost altitude recommendation plan comprises wirelessly transmitting the least cost altitude recommendation plan to the flight management system of the aircraft.

5. The method of claim 1, wherein outputting the least cost altitude recommendation plan comprises sending the least cost altitude recommendation plan to the flight management system of the aircraft.

6. The method of claim 5, wherein sending the least cost altitude recommendation plan comprises wirelessly transmitting the least cost altitude recommendation plan to the flight management system of the aircraft.

7. The method of claim 1, wherein the flight management computer executes the flight operations of the aircraft, based on the least cost altitude recommendation plan, via auto piloting.

8. A system comprising:
a flight management computer; and
an altitude recommendation device comprising:
a communication device configured to receive flight plan information for an aircraft; and
a processor configured to:
generate a least cost altitude recommendation plan during cruise operations for the aircraft based on the flight plan information and a fuel flow model previously generated for the aircraft, wherein the processor generates the least cost altitude recommendation plan by generating a plurality of test altitude recommendation plans and selecting one of the plurality of test altitude recommendations plans, associated with a lowest total cost, as the least cost altitude recommendation plan, wherein each one of the plurality of test altitude recommendation plans is generated by:
predicting a fuel cost for the aircraft based on an estimated fuel flow and the flight plan information to produce a predicted fuel cost;
predicting a time cost based on an operating cost per hour and an estimated flight time to produce a predicted time cost; and
determining a total cost based on the predicted time cost and the predicted fuel cost; and
output the least cost altitude recommendation plan to the flight management computer;
wherein:
the flight management computer is configured to execute flight operations of the aircraft based on the least cost altitude recommendation plan;
the communication device is further configured to receive flight data for the aircraft from a plurality of previous flights;

the processor is further configured to generate the fuel flow model for the aircraft based on the flight data and a fuel flow model based on a type of the aircraft; and the processor is further configured to generate the estimated fuel flow based on the flight data being inserted into a neural network.

9. The system of claim 8, wherein the flight data includes at least one of corrected gross weight of the aircraft, center-of-gravity of the aircraft, altitude, airspeed, international standard atmosphere deviation, temperature, and wind for the plurality of previous flights.

10. The system of claim 9, wherein the processor is further configured to send the least cost altitude recommendation plan to the flight management system of the aircraft.

11. The system of claim 10, wherein the processor is further configured to wirelessly transmit the low cost altitude recommendation plan to the flight management system of the aircraft.

12. The system of claim 8, wherein the processor is further configured to send the least cost altitude recommendation plan to the flight management system of the aircraft.

13. The system of claim 12, wherein the processor is further configured to wirelessly transmit the low cost altitude recommendation plan to the flight management system of the aircraft.

14. The system of claim 8, wherein the flight management computer is configured to execute flight operations of the aircraft, based on the least cost altitude recommendation plan, via auto piloting.

15. A non-transitory computer-readable medium for performing an aircraft specific cruise altitude determination method, via a computer, the method comprising:

receiving flight plan information for an aircraft;

generating a least cost altitude recommendation plan during cruise operations for the aircraft based on the flight plan information and a fuel flow model previously generated for the aircraft, wherein generating the least cost altitude recommendation plan comprises:

generating a plurality of test altitude recommendation plans, each generated by:

predicting a fuel cost for the aircraft based on an estimated fuel flow and the flight plan information to produce a predicted fuel cost;

predicting a time cost based on an operating cost per hour and an estimated flight time to produce a predicted time cost; and determining a total cost based on the predicted time cost and the predicted fuel cost; and selecting one of the plurality of test altitude recommendations plans, associated with the lowest total cost, as the least cost altitude recommendation plan;

outputting the least cost altitude recommendation plan to a flight management computer;

executing, via the flight management computer, flight operations of the aircraft based on the least cost altitude recommendation plan;

receiving flight data for the aircraft from a plurality of previous flights; and generating the fuel flow model for the aircraft based on the flight data and a fuel flow model based on a type of the aircraft;

wherein the flight data includes at least one of corrected gross weight, center-of-gravity of the aircraft, altitude, airspeed, international standard atmosphere deviation, temperature, and wind at a plurality of locations for the plurality of previous flights.

16. The non-transitory computer-readable medium of claim 15, wherein the method further comprises:

inserting the flight data into a neural network; and generating the estimated fuel flow based on output from the neural network after inserting the flight data into the neural network.

17. The non-transitory computer-readable medium of claim 16, wherein outputting the least cost altitude recommendation plan comprises sending the least cost altitude recommendation plan to the flight management system of the aircraft.

18. The non-transitory computer-readable medium of claim 17, wherein outputting the least cost altitude recommendation plan comprises wirelessly transmitting the least cost altitude recommendation plan to the flight management system of the aircraft.

19. The non-transitory computer-readable medium of claim 15, wherein outputting the least cost altitude recommendation plan comprises wirelessly transmitting the least cost altitude recommendation plan to the flight management system of the aircraft.

20. The non-transitory computer-readable medium of claim 15, wherein the flight management computer executes the flight operations of the aircraft, based on the least cost altitude recommendation plan, via auto piloting.

* * * * *